(12) United States Patent
Zhu et al.

(10) Patent No.: US 9,424,220 B2
(45) Date of Patent: Aug. 23, 2016

(54) METHOD AND APPARATUS FOR SETTING WORKING MODE OF MULTI-PROCESSOR SYSTEM

(71) Applicant: Huawei Technologies Co., Ltd., Shenzhen, Guangdong (CN)

(72) Inventors: Xiaoming Zhu, Shenzhen (CN); Guanghui Liu, Hangzhou (CN); Yansong Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 42 days.

(21) Appl. No.: 14/519,644

(22) Filed: Oct. 21, 2014

(65) Prior Publication Data

US 2015/0039799 A1  Feb. 5, 2015

Related U.S. Application Data

(63) Continuation of application No. PCT/CN2013/085088, filed on Oct. 12, 2013.

(30) Foreign Application Priority Data

Apr. 26, 2013 (CN) .......................... 2013 1 0150449

(51) Int. Cl.
*H05K 7/10* (2006.01)
*G06F 13/40* (2006.01)
*G06F 15/16* (2006.01)
*G06F 1/26* (2006.01)
*G06F 15/177* (2006.01)
*G06F 9/44* (2006.01)

(52) U.S. Cl.
CPC .............. *G06F 13/4068* (2013.01); *G06F 1/26* (2013.01); *G06F 9/4405* (2013.01); *G06F 13/409* (2013.01); *G06F 15/16* (2013.01); *G06F 15/177* (2013.01)

(58) Field of Classification Search
USPC .......................... 710/300–317; 713/300–340
See application file for complete search history.

(56) References Cited

U.S. PATENT DOCUMENTS

| | | | |
|---|---|---|---|
| 6,016,518 A | 1/2000 | Matsushima et al. | |
| 6,178,445 B1 | 1/2001 | Dawkins et al. | |
| 6,263,387 B1 * | 7/2001 | Chrabaszcz ......... | G06F 13/4086 709/220 |
| 6,535,944 B1 * | 3/2003 | Johari ................. | G06F 13/4081 710/301 |

(Continued)

FOREIGN PATENT DOCUMENTS

| | | |
|---|---|---|
| CN | 1529254 A | 9/2004 |
| CN | 1916849 A | 2/2007 |

(Continued)

*Primary Examiner* — Raymond Phan

(57) ABSTRACT

A method for setting a working mode of a multi-processor system includes: detecting, after a current board is inserted into a slot of the backplane, whether an associated board exists on the backplane; detecting, if the associated board exists, whether the associated board is in an independent working state; powering on the current board according to a slave working mode if the associated board is not in an independent working state, so as to work coordinately with the associated board; detecting, within a predetermined detection time if the associated board does not exist, whether a board is inserted into another slot of the backplane except the slot of the master board; and powering on the current board according to a master working mode if it is detected that the board is inserted, so as to work coordinately with the board in the other slot.

9 Claims, 13 Drawing Sheets

(56) References Cited

U.S. PATENT DOCUMENTS

| | | | |
|---|---|---|---|
| 6,990,545 B2 * | 1/2006 | Arimilli | G06F 13/4081 710/10 |
| 7,174,467 B1 | 2/2007 | Helms et al. | |
| 7,281,070 B2 | 10/2007 | Bomhoff et al. | |
| 7,761,639 B2 * | 7/2010 | Hikabe | H04L 12/24 710/300 |
| 2004/0073833 A1 | 4/2004 | Krishnamurthy et al. | |
| 2004/0153697 A1 | 8/2004 | Chang et al. | |

FOREIGN PATENT DOCUMENTS

| | | |
|---|---|---|
| CN | 1992649 A | 7/2007 |
| CN | 101001299 A | 7/2007 |
| CN | 101394260 A | 3/2009 |
| CN | 101876962 A | 11/2010 |
| CN | 102724110 A | 10/2012 |
| CN | 102820973 A | 12/2012 |
| CN | 103246634 A | 8/2013 |
| EP | 2 688 258 A1 | 1/2014 |

* cited by examiner

METHOD AND APPARATUS FOR SETTING WORKING MODE OF MULTI-PROCESSOR SYSTEM

CROSS-REFERENCE TO RELATED APPLICATIONS

This application is a continuation of International Application No. PCT/CN2013/085088, filed on Oct. 12, 2013, which claims priority to Chinese Patent Application No. 201310150449.1, filed on Apr. 26, 2013, both of which are hereby incorporated by reference in their entireties.

TECHNICAL FIELD

The present invention relates to the field of computers, and in particular, to a method and an apparatus for setting a working mode of a multi-processor system.

BACKGROUND

In a current computer system, setting manners of a processor come in the following scenarios: Multiple boards exist in a computer, a processor is set on each board to form a single-processor system, and each single-processor system works independently and runs a different OS (operating system, operating system) respectively; and another scenario is that two or more processors are set on one board, work coordinately, and run one OS. In a more complex application scenario, multiple boards need to coordinate in implementing computer functions jointly. Therefore, a common practice is: A connector is installed on the board, the connector connects high-speed interfaces of processors of two boards together, and connection setting is performed for the processors on the two boards beforehand to determine a master-slave relationship and a working mode; and then the boards connected together by the connector are inserted into a backplane. As shown in FIG. 1, the boards connected together in this way can work coordinately according to the setting performed beforehand.

When performing the foregoing technical solution, the inventor finds that at least the following problems exist in the prior art: When multiple boards work coordinately, an extra connector is required to interconnect the boards beforehand, which increases hardware costs. Moreover, it is necessary to perform connection setting and master-slave relationship setting for the boards in advance before the boards can be inserted into slots of the backplane to work. Therefore, once the setting is complete, the setting is hardly modifiable in an application process, which leads to low system flexibility.

SUMMARY

Embodiments of the present invention provide a method and an apparatus for setting a working mode of a multi-processor system without needing to perform connection setting for processors on multiple boards beforehand and without needing to determine a master-slave relationship or a working mode beforehand, so as to enhance system flexibility.

To fulfill the foregoing objectives, the embodiments of the present invention employ the following technical solutions:

According to a first aspect, a method for setting a working mode of a multi-processor system is provided, where: the multi-processor system includes a backplane, and the backplane includes at least two slots for inserting boards, and the method includes:

detecting, after a current board is inserted into a slot of the backplane, whether an associated board exists on the backplane;

detecting, if it is detected that the associated board exists, whether the associated board is in an independent working state; and powering on the current board according to a slave working mode of a slave board if it is detected that the associated board is not in an independent working state, so as to work coordinately with the associated board.

With reference to the first aspect, in a first possible implementation manner of the first aspect, the method further includes:

detecting, within a predetermined detection time if it is detected that the associated board does not exist, whether a board is inserted into another slot of the backplane except the slot of the current board; and powering on the current board according to a master working mode of a master board if it is detected that the board is inserted, so as to work coordinately with the board in the other slot.

With reference to the first possible implementation manner of the first aspect, in a second possible implementation manner, after the detecting whether an associated board exists on the backplane, the method further includes:

identifying the current board as a slave board if the associated board exists; and identifying the current board as a master board if the associated board does not exist.

With reference to the second possible implementation manner of the first aspect, in a third possible implementation manner, if the current board is a slave board, after the detecting whether the associated board is in an independent working state, the method further includes:

powering on the current board according to an independent working mode if the associated board is in an independent working state; and if the current board is a master board, after the detecting, within a predetermined detection time, whether a board is inserted into another slot of the backplane except the slot of the master board, the method further includes:

powering on the current board according to the independent working mode if it is detected that no board is inserted within the detection time.

With reference to the first aspect and the first possible implementation manner of the first aspect to the third possible implementation manner of the first aspect, in a fourth possible implementation manner, if it is detected that the associated board is not in an independent working state, the method further includes:

detecting whether the associated board is in a healthy running state, so that the current board is powered on according to the slave working mode if the associated board is in a healthy running state or that the current board is powered on according to the independent working mode if the associated board is not in a healthy running state.

With reference to the second possible implementation manner of the first aspect, in a fifth possible implementation manner, the powering on the current board according to a master working mode specifically includes:

performing, by a first power supply of the current board, a first power-on action on the current board;

sending a first power-on instruction to each slave board of the current board, so that each slave board of the current board performs the first power-on action respectively according to the first power-on instruction;

receiving a first power-on completion feedback sent by each slave board;

performing, by a second power supply of the current board, a second power-on action on the current board;

sending a second power-on instruction to each slave board of the current board, so that each slave board of the current board performs the second power-on action respectively according to the second power-on instruction;

receiving a second power-on completion feedback sent by each slave board;

performing, by a $K^{th}$ power supply of the current board, a $K^{th}$ power-on action on the current board;

sending a $K^{th}$ power-on instruction to each slave board of the current board, so that each slave board of the current board performs the $K^{th}$ power-on action respectively according to the $K^{th}$ power-on instruction; and receiving a $K^{th}$ power-on completion feedback sent by each slave board, where K is the number of power supplies that need to perform a power-on action in the board.

With reference to the second possible implementation manner or the fifth possible implementation manner of the first aspect, in a sixth possible implementation manner, the method further includes:

forbidding sending of a slave board indication signal and allowing sending of a master board indication signal if the current board is a master board; and allowing sending of a slave board indication signal and forbidding sending of a master board indication signal if the current board is a slave board.

According to a second aspect, an apparatus for setting a working mode of a multi-processor system is provided, including:

a first detecting unit, configured to detect, after a current board is inserted into a slot of a backplane, whether an associated board exists on the backplane;

a second detecting unit, configured to detect, if the first detecting unit detects that the associated board exists, whether the associated board is in an independent working state; and a power-on unit, configured to power on the current board according to a slave working mode of a slave board if the second detecting unit detects that the associated board is not in an independent working state, so as to work coordinately with the associated board.

With reference to the second aspect, in a first possible implementation manner of the second aspect, a third detecting unit is configured to detect, within a predetermined detection time if the first detecting unit detects that the associated board does not exist, whether a board is inserted into another slot of the backplane except the slot of the current board; and the power-on unit is further configured to power on the current board according to a master working mode of a master board if the third detecting unit detects that the board is inserted, so as to work coordinately with the board in the other slot.

With reference to the first possible implementation manner of the second aspect, in a second possible implementation manner, the apparatus further includes an identifying unit, configured to identify the current board as a slave board if the first detecting unit detects that the associated board exists; and the identifying unit is further configured to identify the current board as a master board if the first detecting unit detects that the associated board does not exist.

With reference to the second possible implementation manner of the second aspect, in a third possible implementation manner, if the current board is a slave board, the power-on unit is further configured to power on the current board according to an independent working mode if the second detecting unit detects that the associated board is in an independent working state; and if the current board is a master board, the power-on unit is further configured to power on the current board according to the independent working mode if the third detecting unit detects that no board is inserted within the detection time.

With reference to the second aspect and the first possible implementation manner of the second aspect to the third possible implementation manner of the second aspect, in a fourth possible implementation manner, the apparatus further includes:

a fourth detecting unit, configured to detect, if the second detecting unit detects that the associated board is not in an independent working state, whether the associated board is in a healthy running state, so that the current board is powered on according to the slave working mode if the associated board is in a healthy running state or that the current board is powered on according to the independent working mode if the associated board is not in a healthy running state.

With reference to the second possible implementation manner of the second aspect, in a fifth possible implementation manner, the power-on unit specifically includes:

a first power supply, configured to perform a first power-on action on the current board;

a power-on instruction sending subunit, configured to send a first power-on instruction to each slave board of the current board, so that each slave board of the current board performs the first power-on action respectively according to the first power-on instruction;

a power-on completion feedback receiving subunit, configured to receive a first power-on completion feedback sent by each slave board;

a second power supply, configured to perform a second power-on action on the current board;

the power-on instruction sending subunit is further configured to send a second power-on instruction to each slave board of the current board, so that each slave board of the current board performs the second power-on action respectively according to the second power-on instruction; and the power-on completion feedback receiving subunit is further configured to receive a second power-on completion feedback sent by each slave board; and a $K^{th}$ power supply, configured to perform a $K^{th}$ power-on action on the current board, where the power-on instruction sending subunit is further configured to send a $K^{th}$ power-on instruction to each slave board of the current board, so that each slave board of the current board performs the $K^{th}$ power-on action respectively according to the $K^{th}$ power-on instruction; and the power-on completion feedback receiving subunit is further configured to receive a $K^{th}$ power-on completion feedback sent by each slave board, where K is the number of power supplies that need to perform a power-on action in the board.

With reference to the second possible implementation manner or the fifth possible implementation manner of the second aspect, in a sixth possible implementation manner, the apparatus further includes an indication signal multiplexing unit, where the indication signal multiplexing unit includes N signal cables, each signal cable is used to send at least two types of indication signals, an end A of each signal cable is connected to indication signal sending ports in the current board respectively, an end B of each signal cable is connected to a combining point, and the combining point is electrically connected to a combining point of another board, so as to transmit an indication signal between the current board and another board;

the indication signal multiplexing unit further includes an indication signal gating switch, and, if the current board is a master board, the indication signal gating switch is configured to disconnect, when receiving a slave board indication signal sent by the slave board, a signal cable used to send the slave board indication signal;

if the current board is a master board, the indication signal gating switch is further configured to connect, when sending a master board indication signal to the slave board, a signal cable used to send the master board indication signal;

if the current board is a slave board, the indication signal gating switch is further configured to disconnect, when receiving a master board indication signal sent by the master board, the signal cable used to send the master board indication signal; and if the current board is a slave board, the indication signal gating switch is further configured to connect, when sending a slave board indication signal to the master board, the signal cable used to send the slave board indication signal.

According to the method and the apparatus for setting a working mode of a multi-processor system, which are provided in the embodiments of the present invention, on the one hand, after a current board is inserted into a slot, if it is detected that an associated board exists on a backplane and the associated board is not in an independent working state, the current board is powered on according to a slave working mode, so as to work coordinately with a master board; and, on the other hand, if it is not detected that the associated board exists on the backplane, if insertion of a board is detected within a detection time, the current board is powered on according to a master working mode, so as to work coordinately with a slave board. According to the foregoing solutions, when the board is inserted into the backplane, the board itself can determine and set a working mode, and the working mode does not need to be set beforehand, which enhances system flexibility. In addition, no extra connector is required to perform connection setting for the board, which saves costs.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

The following clearly and describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
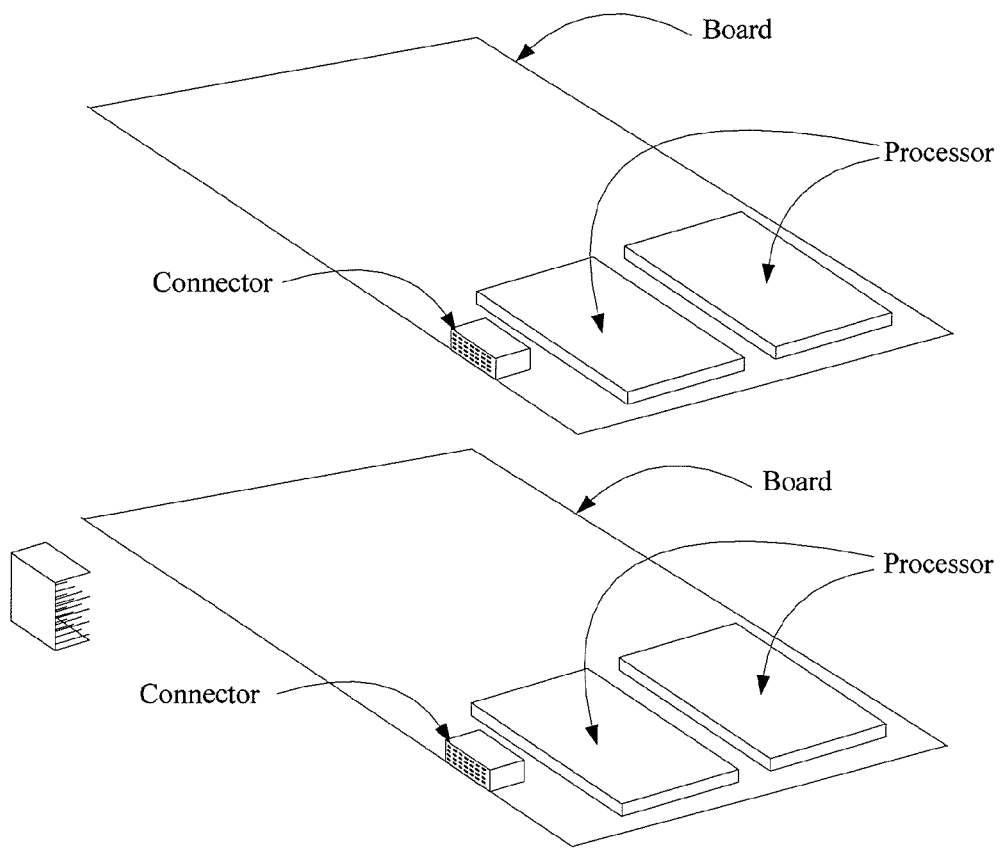
FIG. 1 is a schematic diagram of a board with a connector in the prior art.
Figure 2:
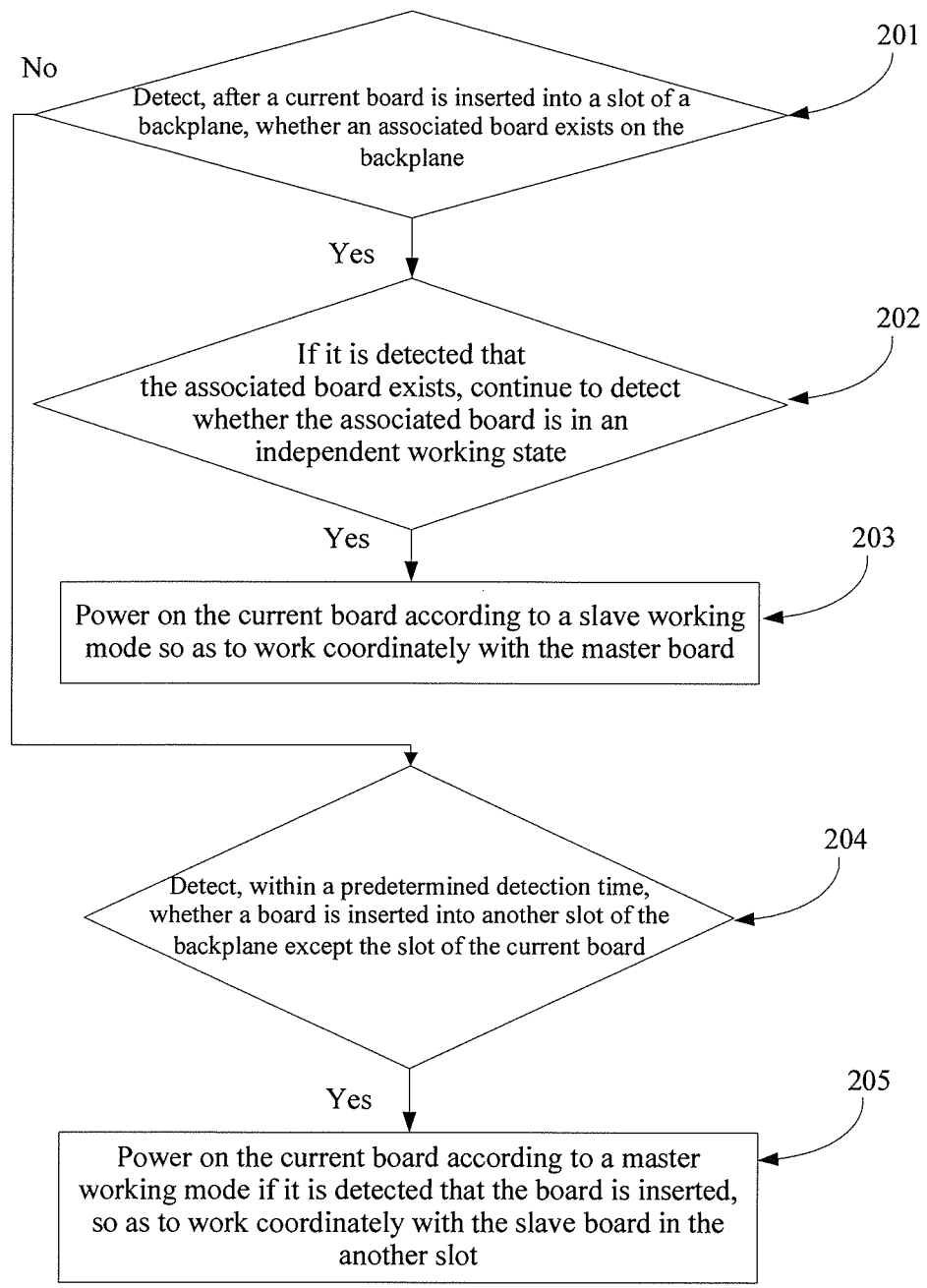
FIG. 2 is a flowchart of a method for setting a working mode of a multi-processor system according to Embodiment 1 of the present invention.

The embodiment of the present invention provides a method for setting a working mode of a multi-processor system. As shown in FIG. 2, the method includes:

201. Detect, after a current board is inserted into a slot of the backplane, whether an associated board exists on the backplane.

The method provided in the embodiment of the present invention is applicable to a multi-processor system. Specifically, the multi-processor system includes a backplane. At least two slots are set on the backplane to facilitate insertion of boards. A board inserted in the slot can work independently or work coordinately with another board according to a master-slave relationship.

According a detection result in step 201, the following 202 or 204 is performed respectively.

202. If it is detected that the associated board exists, continue to detect whether the associated board is in an independent working state.

If it is detected that the associated board exists, the current board may be identified as a slave board first, and then it is detected whether the associated board is in an independent working state.

203. Power on the current board according to a slave working mode if it is detected that the associated board is not in an independent working state, so as to work coordinately with the associated board.

In step 203, the current board serves as a slave board, and the associated board serves as a master board. The master board controls the slave board, and both of them work coordinately.

204. If it is detected that the associated board does not exist, detect, within a predetermined detection time, whether a board is inserted into another slot of the backplane except the slot of the current board.

If it is detected that the associated board does not exist, the current board may be identified as a master board first, and then it is detected whether a board is inserted into another slot of the backplane within the detection time.

205. Power on the current board according to a master working mode if it is detected that the board is inserted, so as to work coordinately with the board in the other slot.

In step 205, the current board is a master board, and the board inserted in the other slot is a slave board. The master board controls the slave board, and both of them work coordinately.

The foregoing 201 to 205 are described by using an example, where a slot 1 and a slot 2 are set on the backplane. After a board 1 is inserted into the slot 1, it is first detected whether a board is inserted into the slot 2, that is, it is detected whether an associated board exists. If no other boards exist on the backplane except the board 1, that is, no associated board exists, the board 1 identifies itself as a master board, and then detects, within a predetermined detection time, whether a board is inserted into the slot 2. If it is detected that a board 2 is inserted into the slot 2 within the detection time, the board 1 is powered on according to the master working mode. In this way, the board 1 can use itself as a master board to control the board 2, and work coordinately. In addition, when the board 2 is inserted into the slot 2, it is first detected whether a board is inserted into the slot 1. Because the board 1 is already in the slot 1, the board 2 identifies itself as a slave board, and then detects whether the board 1 is in an independent working state. According to step 206, it can be seen that the board 1 is not in an independent working state but is detecting the slot 2. At this time, the board 2 is powered on according to the slave working mode, so as to use itself as a slave board to accept control from the master board (that is, the board 1) and work coordinately with the master board.

The independent working state mentioned above means that the board does not form a master-slave coordination relationship with another board to jointly run an OS, but runs an OS independently.

According to the method for setting a working mode of a multi-processor system, which is provided in the embodiment of the present invention, on the one hand, after a current board is inserted into a slot, if it is detected that an associated board exists on a backplane and the associated board is not in an independent working state, the current board is powered on according to a slave working mode, so as to work coordinately with a master board; and, on the other hand, if it is not detected that the associated board exists on the backplane, if insertion of a board is detected within a detection time, the current board is powered on according to a master working mode, so as to work coordinately with a slave board. According to the foregoing solutions, when the board is inserted into the backplane, the board itself can determine and set a working mode, and the working mode does not need to be set in advance before the board is inserted into the backplane, which enhances system flexibility. In addition, no extra connector is required to connect the board, which saves costs.

Embodiment 2

Figure 3:
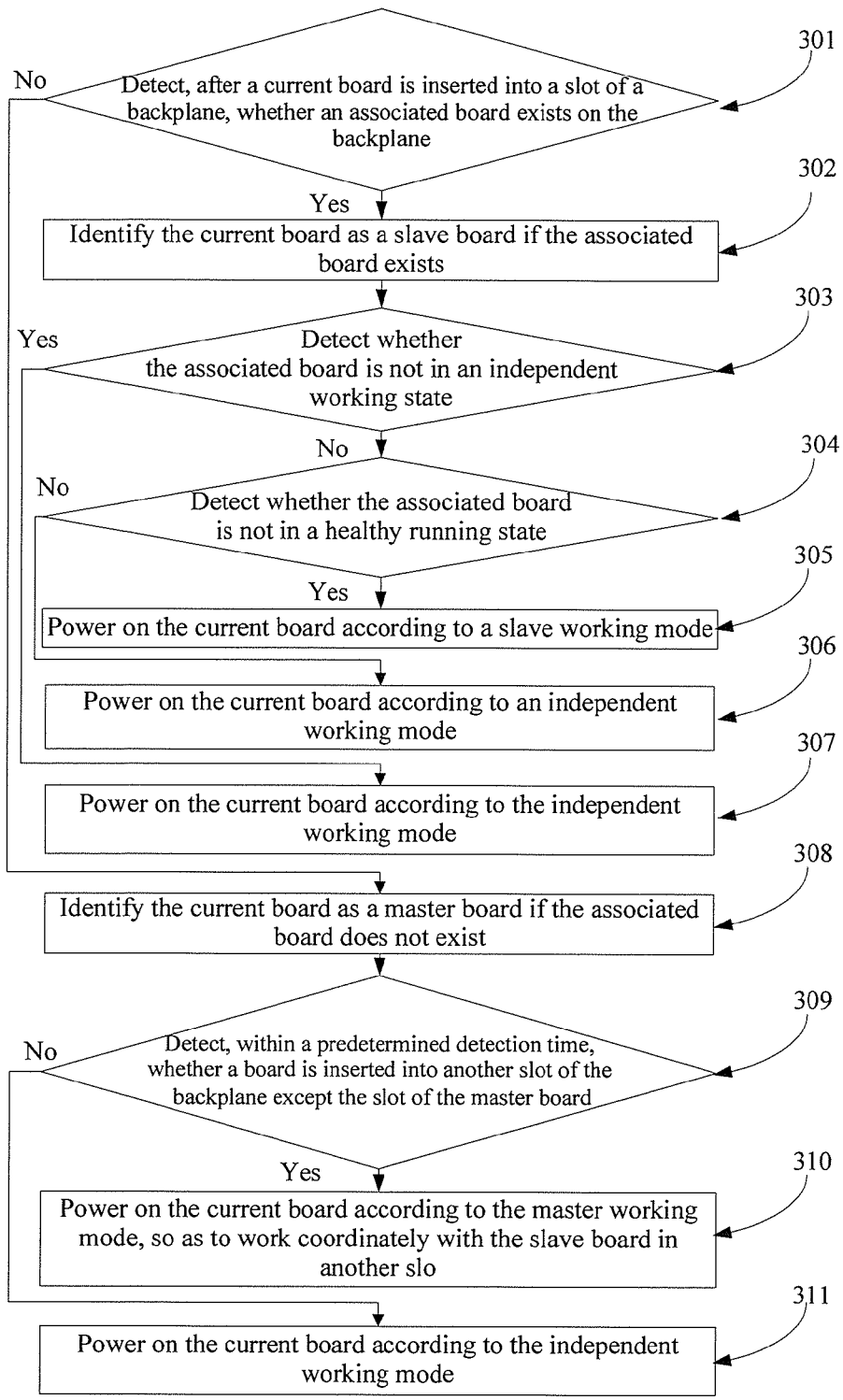
FIG. 3 is a flowchart of a method for setting a working mode of a multi-processor system according to Embodiment 2 of the present invention.

The embodiment of the present invention provides a method for setting a working mode of a multi-processor system. As shown in FIG. 3, the method includes:

301. Detect, after a current board is inserted into a slot of the backplane, whether an associated board exists on the backplane.

The method provided in the embodiment of the present invention is applicable to a multi-processor system. Specifically, the multi-processor system includes a backplane. At least two slots are set on the backplane to facilitate insertion of boards. A board inserted in the slot can work independently or work coordinately with another board according to a master-slave relationship.

According a detection result in step 301, the following 302 or 308 is performed respectively.

302. Identify the current board as a slave board if the associated board exists.

303. Detect, after the current board is identified as a slave board, whether the associated board is in an independent working state.

The independent working state mentioned above means that the board does not form a master-slave coordination relationship with another board to jointly run an OS, but runs an OS independently.

According a detection result, the following 304 and 307 are performed respectively.

304. Detect, if the associated board is not in an independent working state, whether the associated board is in a healthy running state.

According a detection result in step 304, 305 and 306 are performed respectively.

The healthy running state mentioned in step 304 may be represented by multiple means. For example, a board A is inserted into a slot of the backplane first, and then a board B is inserted into the backplane. The board B detects that the board A is an associated board, and that the board A is not in an independent working state. After the board A is inserted into the slot, some power supplies on the board A perform a power-on action proactively. If electricity can be discharged normally after completion of the power-on action, it is deemed that the board A is in a healthy running state. The board B measures a part of pins of a processor on the board A to know whether the board A is in a healthy running state: assuming that an output level of a pin X jumps periodically when the board A is in a healthy running state, the board B can determine the healthy running state of the board A by checking the pin X.

305. Power on the current board according to a slave working mode if the associated board is in a healthy running state, so as to work coordinately with a master board.

Still using the board A and the board B as an example, where the board B is a slave board and the board A is a master board, the board B is powered on according to the slave working mode, and the board A is powered on according to a master working mode, so that the board A controls the board B, and both of them run one OS jointly.

306. Power on the current board according to an independent working mode if the associated board is not in a healthy running state.

If the associated board is not in a healthy running state, it indicates that the associated board cannot work coordinately with the current board according to a master-slave relationship. In this case, the current board may be powered on according to the independent working mode and runs an OS independently.

307. Power on the current board according to the independent working mode if the associated board is in an independent working state.

If the associated board is already in an independent working state, it indicates that the associated board is already running an OS independently, and cannot work coordinately with the current board according to a master-slave relationship. In this case, the current board may be powered on according to the independent working mode and runs an OS independently.

308. Identify the current board as a master board if the associated board does not exist.

309. Detect, within a predetermined detection time, whether a board is inserted into another slot of the backplane except the slot of the master board.

310. Power on the current board according to the master working mode if it is detected that the board is inserted, so as to work coordinately with the slave board in the other slot.

311. Power on the current board according to the independent working mode if it is detected that no board is inserted within the detection time.

The foregoing 301 to 311 are described by using an example. It is assumed that a slot 1, a slot 2, and a slot 3 are set on the backplane. After a board 1 is inserted into the slot 1, it is first detected whether a board is inserted into the slot 2 and the slot 3, that is, it is detected whether an associated board exists. If no other boards exist on the backplane except the board 1, that is, no associated board exists, the board 1 identifies itself as a master board, and then detects, within a predetermined detection time, whether a board is inserted into the slot 2 and the slot 3. If it is detected, within the detection time, that a board 2 is inserted into the slot 2, the board 1 is powered on according to the master working mode. In this way, the board 1 can use itself as a master board to control the board 2, and work coordinately. In addition, when the board 2 is inserted into the slot 2, it is first detected whether a board is inserted into the slot 1 and the slot 3. Because the board 1 is already in the slot 1, the board 2 identifies itself as a slave board, and then detects whether the board 1 is in an independent working state. If the board 1 is not in an independent working state and the board 1 is in a healthy running state, the board 2 in this case is powered on according to the slave working mode, so as to use itself as a slave board to accept control from the master board (that is, the board 1) and work coordinately with the master board. In addition, after the board 1 and the board 2 start to work coordinately in a master-slave relationship, the board 3 is inserted into the slot 3. Because both the slot 1 and the slot 2 have boards, the board 3 identifies itself as a slave board. Then the board 3 detects whether the associated boards (that is, the board 1 and the board 2) are in an independent working state. Because the board 1 and the board 2 have formed a master-slave coordination relationship, neither of them is in an independent working state. The board 3 continues to detect whether the board 1 and the board 2 are in a healthy running state. Assuming that both the board 1 and the board 2 run abnormally rather than in a healthy running state at this time, the board 3 is powered on according to the independent working mode. If only the board 2 runs abnormally, the board 2 is isolated, and then the board 3 serves as a slave board of the board 1 to work coordinately with the board 1 according to a master-slave relationship. In another scenario, if only the board 1 runs abnormally, the board 1 serving as a master board is isolated, and then the board 2 and the board 3 form a new master-slave relationship to work coordinately.

It should be noted that when multiple boards work coordinately according to a master-slave relationship, each board checks whether its power supply, clock, and peripherals are in a normal state. Once a board detects abnormality of its power supply, clock, or peripherals, the board sends abnormality information to other boards by using a level signal, and then the abnormal board is isolated, and other boards form a new master-slave relationship to work coordinately.

Figure 6:
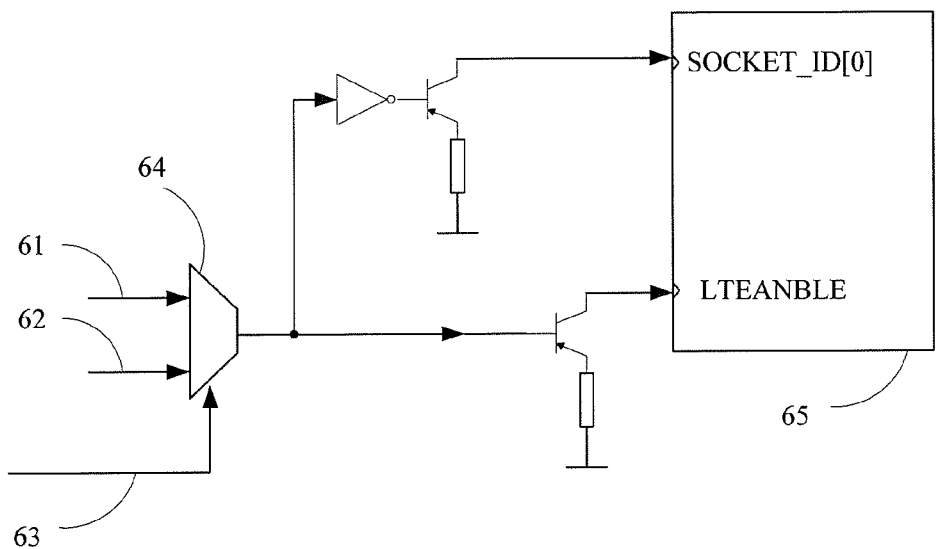
FIG. 6 is a schematic circuit diagram of setting a working mode of a processor according to Embodiment 2 of the present invention.

It should be further noted that if the current board is powered on according to the master working mode and the current board has only one processor, the processor is set as a master processor; and, if the current board has multiple processors, the processor attached to a south bridge is used as a master processor, and other processors are slave processors. For details of setting a working mode of the processor, reference may be made to FIG. 6. A comparer 64 is set on the board. The comparer 64 has two signal input ends for inputting a signal 61 and a signal 62 respectively. Here it is assumed that the signal 61 is a high level, and is used to instruct a processor 65 to enter a master processor working mode, and the signal 62 is a low level, and is used to instruct the processor 65 to enter a slave processor working mode. In addition, a gating signal 63 exists. According to the gating signal 63, the comparer 64 selects to transmit the signal 61 or the signal 62 to the processor 65. Assuming that the signal 61 passes through the comparer 64, the signal 61 passes through a triode shown in FIG. 6 and then enters ports SOCKET_ID[0] and LTENABLE respectively, and then the processor 65 enters the master processor working mode.

Figure 4:
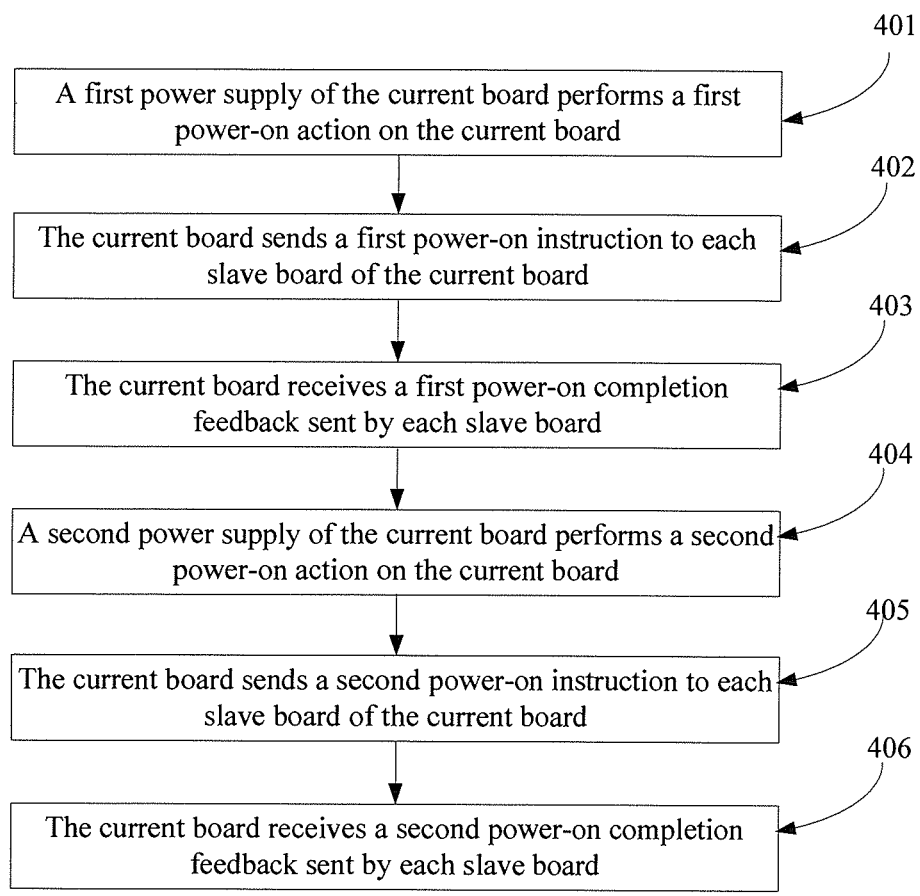
FIG. 4 is a flowchart of a power-on control manner according to Embodiment 2 of the present invention.

Further, when multiple boards work coordinately according to a master-slave relationship, a power-on order needs to be controlled uniformly. Specifically, if the current board works in the master working mode and other boards work in the slave working mode, as shown in FIG. 4, the power-on control manner includes:

401. A first power supply of the current board performs a first power-on action on the current board.

In a practical scenario, different power supplies of the board perform the power-on in a definite order. Here it is assumed that the first power supply needs to perform the power-on first.

402. The current board sends a first power-on instruction to each slave board of the current board.

After performing the first power-on action, the current board sends the first power-on instruction to each slave board. The first power-on instruction is used to instruct each slave board to perform the first power-on action respectively.

According to the foregoing 401 and 402, it can be seen that the current board serving as a master board controls the power-on action of each slave board. That is to say, after performing the first power-on action, the first power supply of the master board instructs each slave board to perform the first power-on action.

403. The current board receives a first power-on completion feedback sent by each slave board.

After finishing the first power-on action, the slave board sends a first power-on completion feedback to the current board. After receiving the first power-on completion feedback of all slave boards, the current board continues to perform step 404.

404. A second power supply of the current board performs a second power-on action on the current board.

As described above, different power supplies of the board perform the power-on in a definite order. It is assumed that the first power supply needs to perform the power-on first and the second power supply performs the power-on action after the first power supply finishes the power-on.

405. The current board sends a second power-on instruction to each slave board of the current board.

Each slave board performs the second power-on action respectively according to the second power-on instruction.

According to the foregoing 404 and 405, it can be seen that, after performing the second power-on action, the second power supply of the current board serving as a master board instructs each slave board to perform the same second power-on action.

406. The current board receives a second power-on completion feedback sent by each slave board.

After finishing the second power-on action, the slave board sends a second power-on completion feedback to the current board. After the current board receives the second power-on completion feedback of all slave boards, if other power supplies (such as a third power supply, a fourth power supply, . . . , a $K^{th}$ power supply) still need to continue the power-on, the current board may continue to perform the power-on by referring to the foregoing 401 to 406 until all power supplies of the master board and the slave board finish the power-on.

According to the foregoing 401 to 406, when the master board and the slave board work coordinately, a correct power-on order of each board can be ensured. Especially, it is ensured that an $(X+1)^{th}$ power-on action is further performed after an $X^{th}$ power-on action of all boards is finished, which avoids disorder of the power-on of each board.

Figure 7:
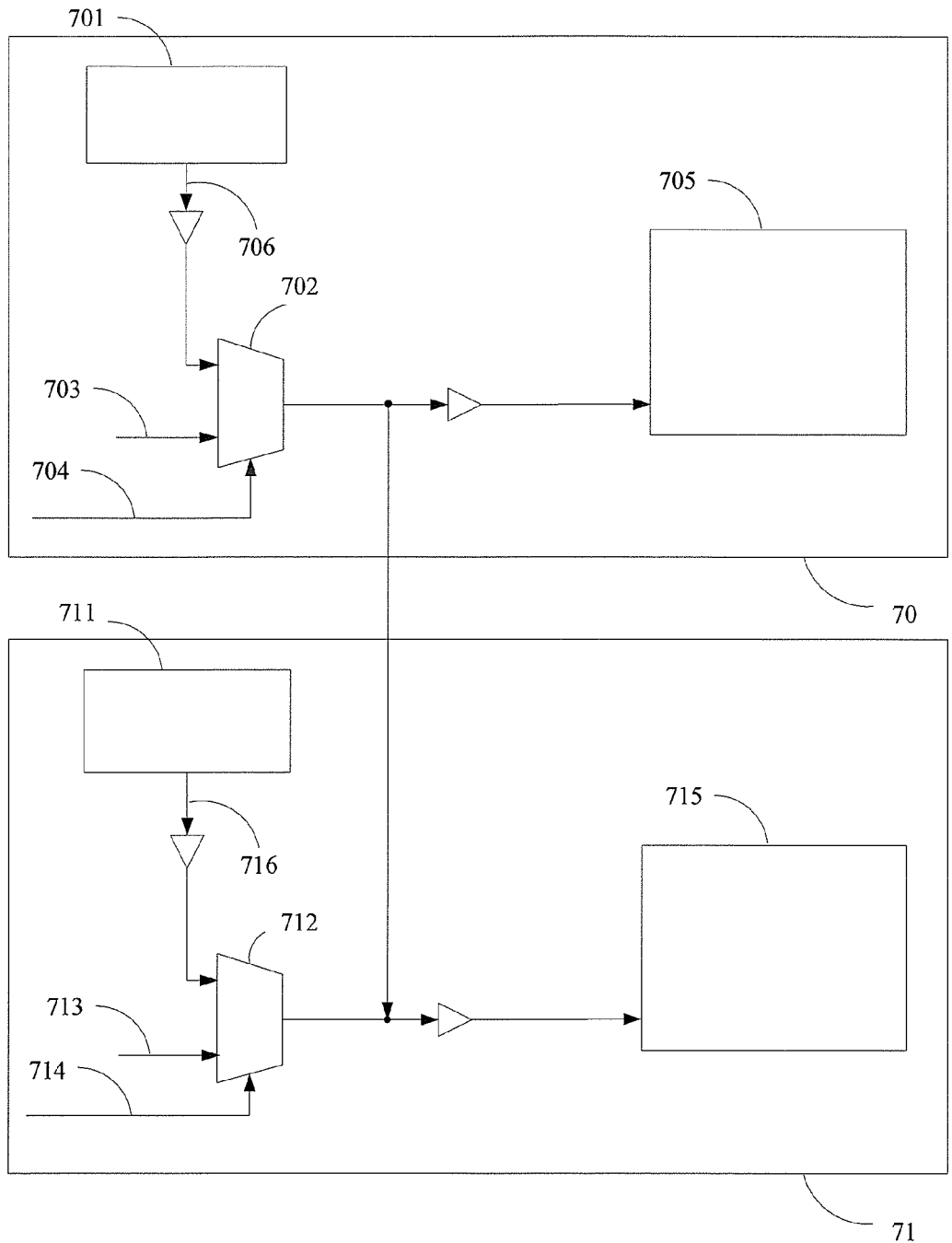
FIG. 7 is a schematic circuit diagram of power-on control performed by a master board on a slave board according to Embodiment 2 of the present invention.

For detailed description about the power-on of each board, reference may be made to FIG. 7. In FIG. 7, a board 70 and a board 71 form a multi-processor system, where the board 70 is a master board, and the board 71 is a slave board. In the power-on process, a motherboard chip 701 of the board 70 provides a power-on voltage signal 706, and the power-on voltage signal 706 enters one end of a selector 702, and a high-impedance state signal 703 is input into the other end of the selector 702. In addition, a gating signal 704 exists. According to the gating signal 704, the selector 702 selects the power-on voltage signal 706 or the high-impedance state signal 703. The gating signal 704 has different level values depending on different states of the board 70. For example, when the board 70 is a master board, the gating signal 704 controls the selector 702 to let the power-on voltage signal 706 pass, and further power on the processor 705; or, if the board 70 is a slave board, the gating signal 704 controls the selector 702 to let the high-impedance state signal 703 pass, and, in this case, the power-on voltage signal 706 cannot power on the processor 705. After passing through the selector 702, the power-on voltage signal 706 is further input onto the board 71. In this way, a processor 715 of the board 71 can perform power-on according to the power-on voltage signal 706; meanwhile, a gating signal 714 controls the selector 712 to let a high-impedance state signal 713 pass but forbid pass of a power-on voltage signal 716 provided by a motherboard chip 711. In this way, the power-on action of the board 71 is completely controlled by the board 70. The foregoing description is merely a brief description about a power-on process where the master board controls the slave board. In a practical scenario, the specific setting manner of a control circuit on the board may be different from that shown in FIG. 7, which is not described exhaustively in the embodiment of the present invention.

Figure 8:
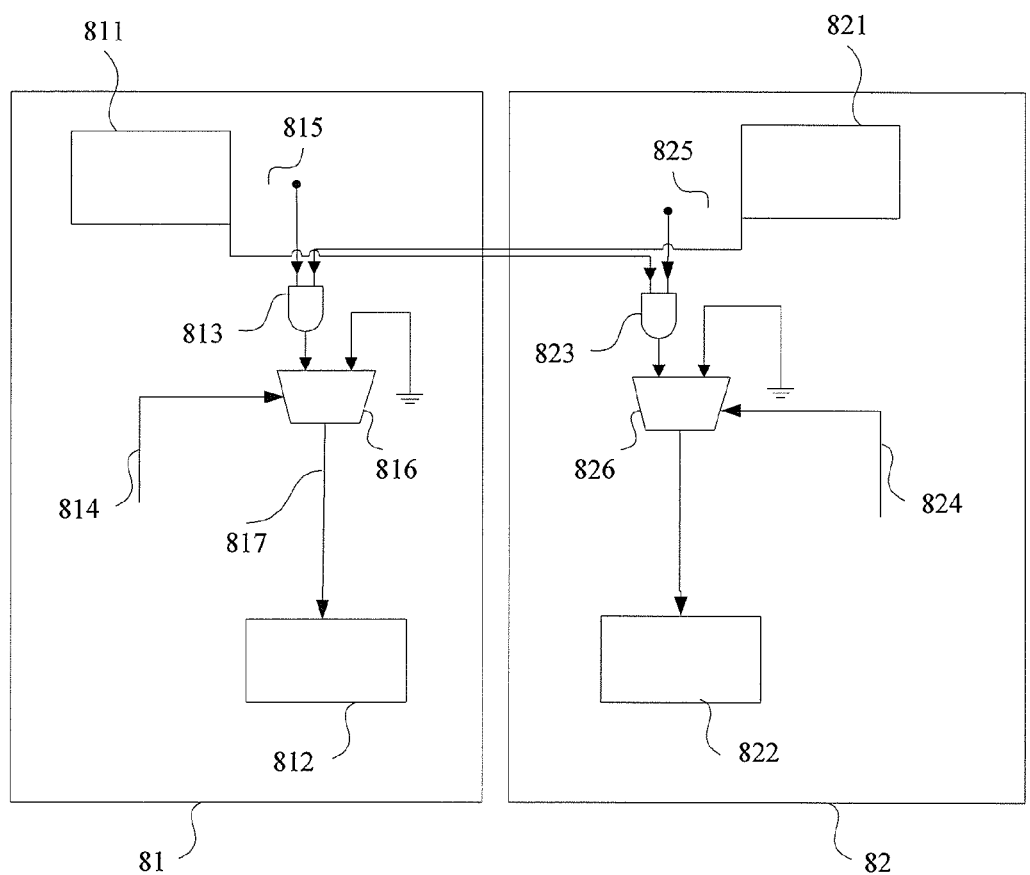
FIG. 8 is a schematic diagram of signal transfer of power-on completion feedback according to Embodiment 2 of the present invent ion.

In addition, for details of receiving, by the current board, the first power-on completion feedback sent by each slave board, which is described in step 403, reference may be made to FIG. 8. In FIG. 8, a board 81 is a master board, and a board 82 is a slave board. After finishing power-on, a first power supply 811 and a first power supply 812 send a first power-on completion feedback respectively. Specifically, the power supply 811 sends a first power-on completion feedback 815, and the power supply 812 sends a first power-on completion feedback 825. The two power-on completion feedbacks may be state steadiness indication signals (assuming that they are high levels) sent by their respective power supply after the power-on state gets steady. As shown in FIG. 8, the first power-on completion feedback of each board is sent between boards reciprocally. In the board 81, 815 and 825 enter a logical AND gate 813. The signal cannot pass the logical AND gate 813 until both 815 and 825 are high levels (that is, the first power supplies of both boards send the state steadiness indication signal). Then signal gating is performed on a selector 816. Because the board 81 is a master board, under control of a gating signal 814, the selector 816 causes a signal 817 that has passed through the logical AND gate 813 to pass, where the signal 817 is used to instruct a second power supply 812 to perform a second power-on action on the board 81. In addition, on the board 82, the signal that has passed through a logical AND gate 823 and a grounding signal serve as two input signals of a selector 826. Because the board 82 is a slave board, under control of a gating signal 824, the grounding signal passes through the selector 826. At this time, a second power supply 822 does not perform the second power-on action. After finishing the second power-on action and entering a steady state, a second power supply 821 may instruct the second power supply 822 to perform power-on.

According to the structure and the signal transfer process shown in FIG. 8, the second power supply of the master board may perform the power-on first after the first power supply finishes power-on, which ensures a correct power-on order when multiple boards work coordinately in a master-slave manner.

Figure 9:
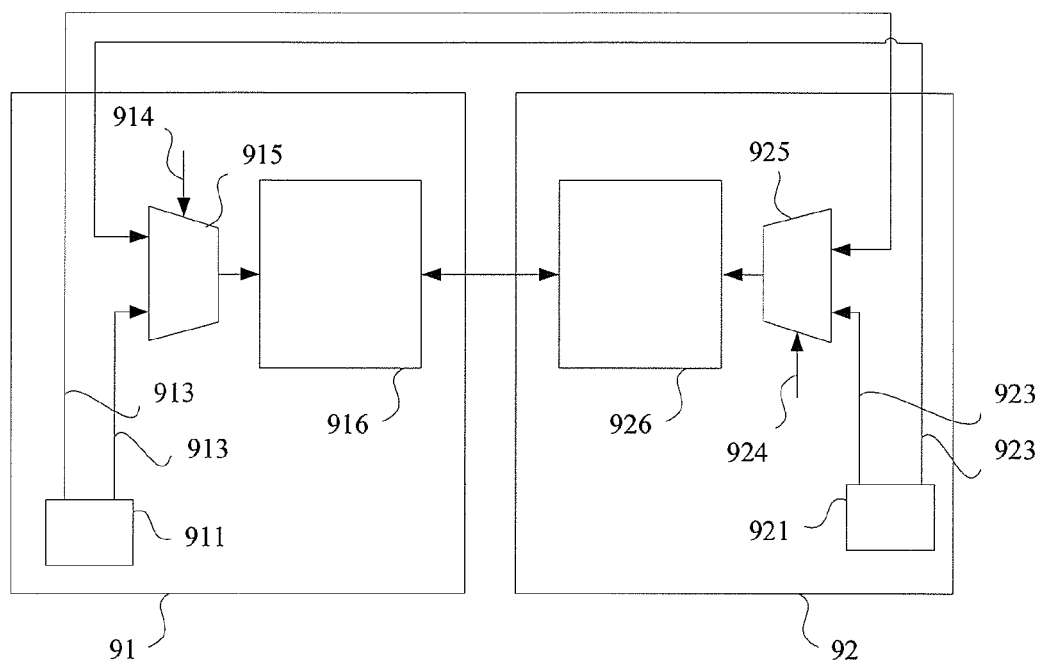
FIG. 9 is a schematic circuit diagram of sharing a master board clock according to Embodiment 2 of the present invention.

In addition, in a case where the master board controls each slave board to work coordinately, each board needs to use a clock of the master board as a reference. A circuit structure shown in FIG. 9 can ensure each slave board to accept clock control from the master board. It is assumed that a board 91 is a master board and a board 92 is a slave board. A clock 911 exists on the board 91, and a clock 921 exists on the board 92. A clock signal 913 of the clock 911 and a clock signal 923 of the clock 921 are sent to a board of each other reciprocally. Two input ends of a selector 915 are the clock signals 913 and 923. As controlled by a gating signal 914, different clock signals are selected to pass. Because the board 91 is a master board, the gating signal 914 selects the clock signal 913 to pass and enter a central processing unit 916. In addition, because the board 92 is a slave board, a gating signal 924 selects the clock signal 913 to pass and enter a central processing unit 926 but discards the clock signal 923. In this case, the slave board receives the clock signal of the master board, and runs under control of the clock signal of the master board.

According to the method for setting a working mode of a multi-processor system, which is provided in the embodiment of the present invention, on the one hand, after a current board is inserted into a slot, if it is detected that an associated board exists on a backplane and the associated board is not in an independent working state, the current board is powered on according to a slave working mode, so as to work coordinately with the master board; and, on the other hand, if it is not detected that the associated board exists on the backplane, if insertion of a board is detected within a detection time, the current board is powered on according to a master working mode, so as to work coordinately with a slave board. According to the foregoing solutions, when the board is inserted into the backplane, the board itself can determine and set a working mode, and the working mode does not need to be set in advance before the board is inserted into the backplane, which enhances system flexibility. In addition, no extra connector is required to connect the board, which saves costs. In addition, the master board controls a power-on time sequence of each board, which ensures a correct power-on order of each board in the multi-processor system.

Figure 5:
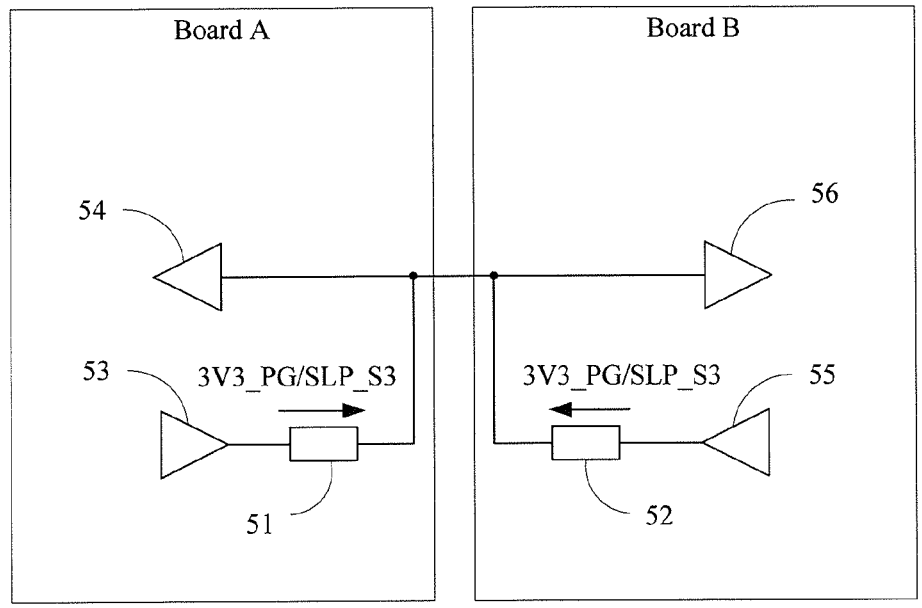
FIG. 5 is a schematic circuit diagram of multiplexing a signal according to Embodiment 2 of the present invention.

In addition, in a practical multi-processor system, plenty of control signals and time sequence signals need to be transferred between different boards. A board in the embodiment of the present invention may serve as either a master board or a slave board. Therefore, when serving as a master board, the board is required to be capable of receiving a slave board indication signal sent by a slave board, and when serving as a slave board, to be capable of sending a master board indication signal. Therefore, on the one hand, when the current board is a master board, the slave board indication signal needs to be forbidden from being sent out of the current board, so that the current board receives only the slave board indication signal sent by the slave board; meanwhile, the master board indication signal is allowed to be sent out of the current board, so that the current board can send the master board indication signal to the slave board. On the other hand, when the current board is a slave board, the master board indication signal needs to be forbidden from being sent out of the current board, and the current board is allowed to send the slave board indication signal to the master board. For the specific implementation manner, reference may be made to FIG. 5. An SLP_S3 signal in FIG. 5 is a control signal sent by the master board to the slave board, and a 3V3_PG signal is a feedback signal sent by the slave board to the master board. It is assumed that the board A in FIG. 5 is a master board, and the board B is a slave board; a signal sending port 53 and a signal receiving port 54 exist on the board A, and a signal sending port 55 and a signal receiving port 56 exist on the board B; and the sending ports 53 and 55 are multiplexing ports and can send the SLP_S3 signal and the 3V3_PG signal. The SLP_S3 signal can only be sent by the board A to the board B, and cannot be sent by the board B to the board A; and the 3V3_PG signal can only be sent by the board B to the board A, and cannot be sent by the board A to the board B. Therefore, a switch 51 and a switch 52 are set. When the board A sends the SLP_S3 signal, the switch 51 connects a line, so that the SLP_S3 signal is sent from the port 53 to the port 56, and the switch 52 is disconnected at the same time to avoid that the SLP_S3 signal is sent from the port 55 to the port 54. When the board B sends the 3V3_PG signal, the switch 52 connects the line, so that the 3V3_PG signal is sent from the port 55 to the port 54, and the switch 51 is disconnected at the same time to avoid that the 3V3_PG signal is sent from the port 53 to the port 56.

The signal transfer manner described above and shown in FIG. 5 can transmit different signals at separate time, for example, can transfer multiple types of signals from the port 53 of the board A to the port 56 of the board B at separate time, which reduces the number of distributed cables and saves space.

The implementation manner shown in FIG. 5 can not only ensure correct transfer of signals between the master board and the slave board, but also implement line multiplexing, which avoids distribution of a large number of signal cables and saves space and costs.

Embodiment 3

Figure 10:
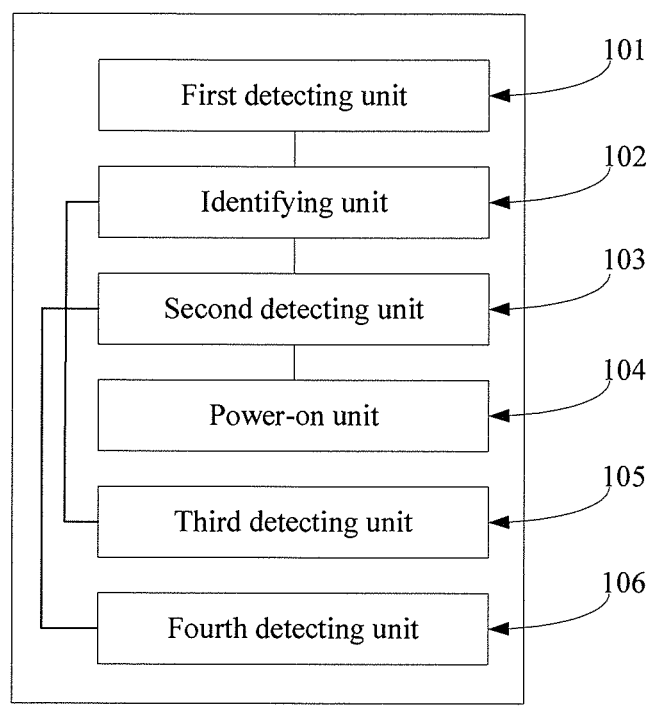
FIG. 10 is a block diagram of an apparatus for setting a working mode of a multi-processor system according to Embodiment 3 of the present invention.

The embodiment of the present invention provides an apparatus for setting a working mode of a multi-processor system. As shown in FIG. 10, the apparatus includes:

a first detecting unit 101, configured to detect, after a current board is inserted into a slot of a backplane, whether an associated board exists on the backplane;

an identifying unit 102, configured to identify the current board as a slave board if the detecting unit 101 detects that the associated board exists, where the identifying unit 102 is further configured to identify the current board as a master board if the first detecting unit 101 detects that the associated board does not exist;

a second detecting unit 103, configured to detect, after the identifying unit 102 identifies the current board as a slave board, whether the associated board is in an independent working state; and a power-on unit 104, configured to power on the current board according to a slave working mode of a slave board if the second detecting unit 103 detects that the associated board is not in an independent working state, so as to work coordinately with the associated board.

Further, the apparatus further includes a third detecting unit 105, configured to detect, within a predetermined detection time after the identifying unit 102 identifies the current board as a master board, whether a board is inserted into another slot of the backplane except the slot of the master board.

The power-on unit 104 is further configured to power on the current board according to a master working mode of a master board if the third detecting unit 105 detects that the board is inserted, so as to work coordinately with the board in the other slot.

Further, if the current board is a slave board, the power-on unit 104 is further configured to power on the current board according to an independent working mode if the second detecting unit 103 detects that the associated board is in an independent working state.

In addition, if the current board is a master board, the power-on unit 104 is further configured to power on the current board according to the independent working mode if the third detecting unit 105 detects that no board is inserted within the detection time.

Further, the apparatus further includes a fourth detecting unit 106, configured to detect, if the second detecting unit 103 detects that the associated board is not in an independent working state, whether the associated board is in a healthy running state.

According to the detection performed by the fourth detecting unit 106, the current board is powered on according to the slave working mode if the associated board is in a healthy running state; and, the current board is powered on according to the independent working mode if the associated board is not in a healthy running state.

Figure 11:
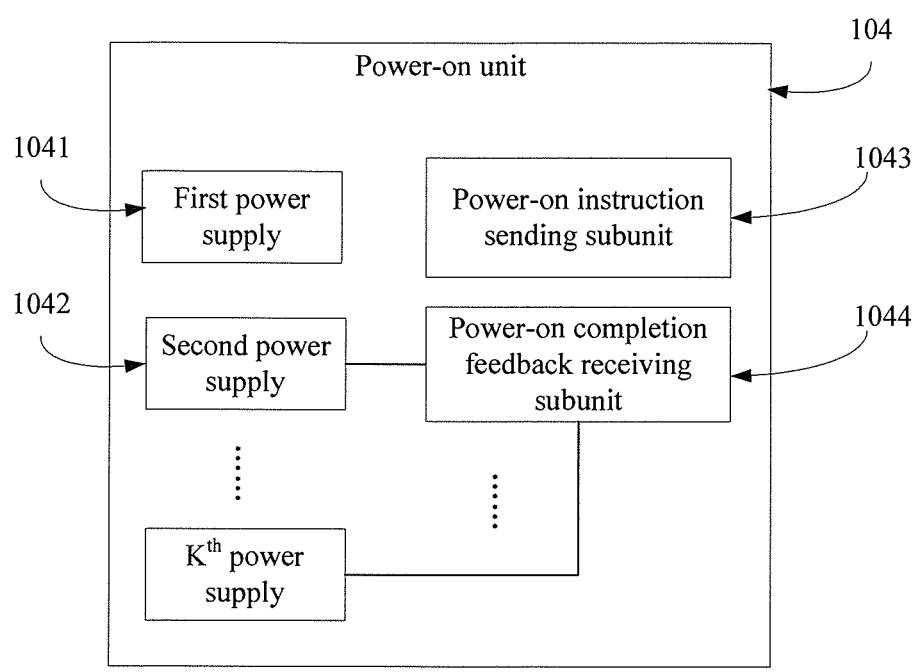
FIG. 11 is a block diagram of a power-on unit according to Embodiment 3 of the present invention.

Further, as shown in FIG. 11, the power-on unit 104 specifically includes a first power supply 1041, a second power supply 1042, . . . , a $K^{th}$ power supply, where K is the number of power supplies that need to perform a power-on action in the board.

The first power supply 1041 is configured to perform a first power-on action on the current board. The second power supply 1042 is configured to perform a second power-on action on the current board.

In addition, the power-on unit 104 further includes a power-on instruction sending subunit 1043, configured to send a first power-on instruction to each slave board of the current board, so that each slave board of the current board performs the first power-on action respectively according to the first power-on instruction; the power-on instruction sending subunit 1043 is further configured to send a second power-on instruction to each slave board of the current board, so that each slave board of the current board performs the second power-on action respectively according to the second power-on instruction; and the power-on instruction sending subunit 1043 is further configured to send a $K^{th}$ power-on instruction to each slave board of the current board, so that each slave board of the current board performs a $K^{th}$ power-on action respectively according to the $K^{th}$ power-on instruction.

The power-on unit 104 further includes a power-on completion feedback receiving subunit 1044, configured to receive a first power-on completion feedback, a second power-on completion feedback, . . . , a $K^{th}$ power-on completion feedback that are sent by each slave board.

After the first power supply 1041 performs the first power-on action, the power-on instruction sending subunit 1043 sends the first power-on instruction to each slave board of the current board, so that each slave board performs the first power-on action respectively and then sends the first power-on completion feedback to the master board. After the power-on completion feedback receiving subunit 1044 receives the first power-on completion feedback, the first power-on action of each slave board is finished at this time. Subsequently, the second power supply 1042 of the master board performs the second power-on action, and then the power-on instruction sending subunit 1043 sends the second power-on instruction to each slave board, and each slave board performs the second power-on action respectively. In this way, whenever each slave board finishes power-on of the current power supply, the master board continues to perform power-on of a next power supply, and controls each slave board to perform power-on of the next power supply until completion of power-on of all power supplies.

Figure 12:
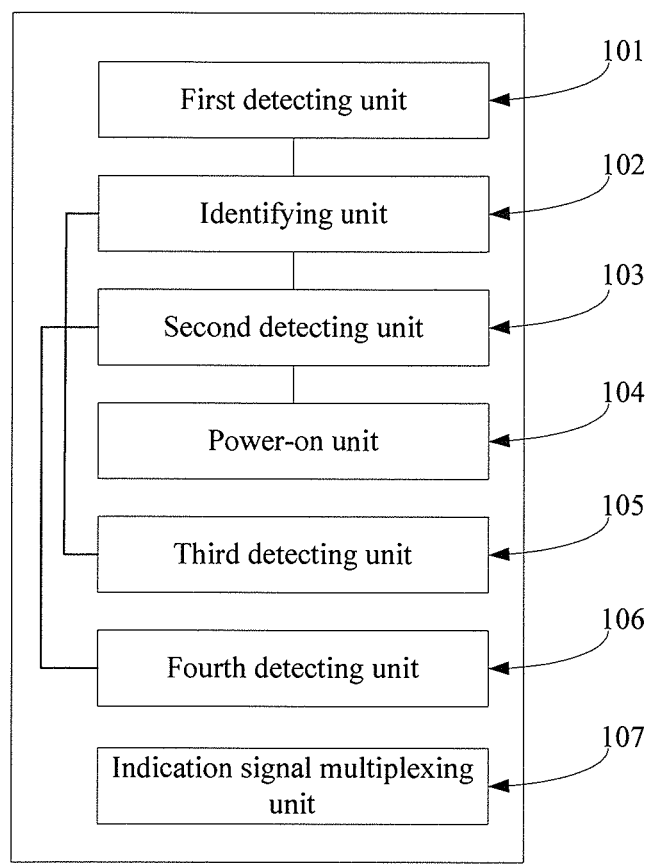
FIG. 12 is a block diagram of another apparatus for setting a working mode of a multi-processor system according to Embodiment 3 of the present invention.

Further, as shown in FIG. 12, the apparatus may further include an indication signal multiplexing unit 107.

Figure 13:
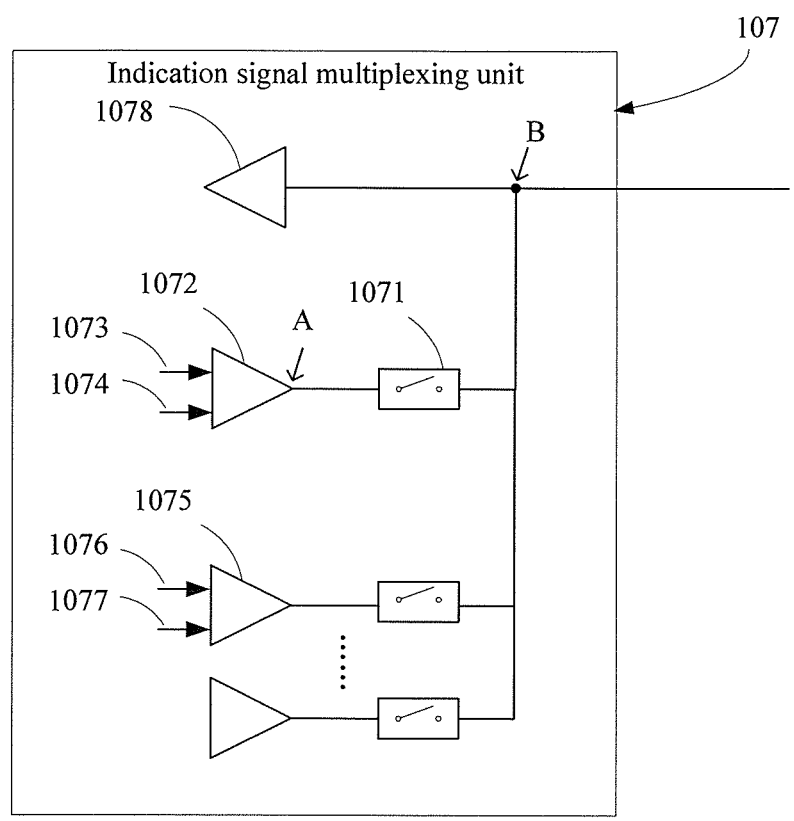
FIG. 13 is a specific schematic structural diagram of an indication signal multiplexing unit according to Embodiment 3 of the present invention.

Specifically, as shown in FIG. 13, the indication signal multiplexing unit 107 includes N signal cables, each signal cable is used to send at least two types of indication signals, an end A of each signal cable is connected to different indication signal sending ports in the current board respectively, an end B of each signal cable is connected to a combining point, and the combining point is electrically connected to a combining point of another board, so as to transmit an indication signal between the current board and another board. The indication signal multiplexing unit 107 further includes an indication signal gating switch 1071. If the current board is a master board, the indication signal gating switch 1071 disconnects a signal cable used to send a slave board indication signal; and, if the current board is a master board, the indication signal gating switch 1071 connects a signal cable used to send a master board indication signal. If the current board is a slave board, the indication signal gating switch connects the signal cable used to send the slave board indication signal; and, if the current board is a slave board, the indication signal gating switch disconnects the signal cable used to send the master board indication signal. In FIG. 13, an indication signal sending port 1072 is configured to send a master board indication signal 1073 and a slave board indication signal 1074, and an indication signal sending port 1075 is configured to send a master board indication signal 1076 and a slave board indication signal 1077. Using the indication signal sending port 1072 as an example, if the current board is a master board, when the master board indication signal 1073 is sent, the indication signal gating switch 1071 connects a signal cable connected to the indication signal sending port 1072; and, when the slave board indication signal 1074 sent by another board is received, the indication signal gating switch 1071 disconnects the signal cable connected to the indication signal sending port 1072, so as to prevent the current board that serves as a master board from sending the slave board indication signal 1074. If the current board is a slave board, when the slave board indication signal 1074 is sent, the indication signal gating switch 1071 connects the signal cable connected to the indication signal sending port 1072; and, when the master board indication signal 1073 sent by another board is received, the indication signal gating switch 1071 disconnects the signal cable connected to the indication signal sending port 1072, so as to prevent the current board that serves as a slave board from sending the master board indication signal 1073.

In addition, an indication signal receiving port 1078 is shown in FIG. 13, and is configured to receive a master board indication signal or slave board indication signal sent from another board. The indication signal receiving port 1078 here is merely exemplary, and the number of indication signal receiving ports may be specifically set according to a practical application scenario.

Figure 14:
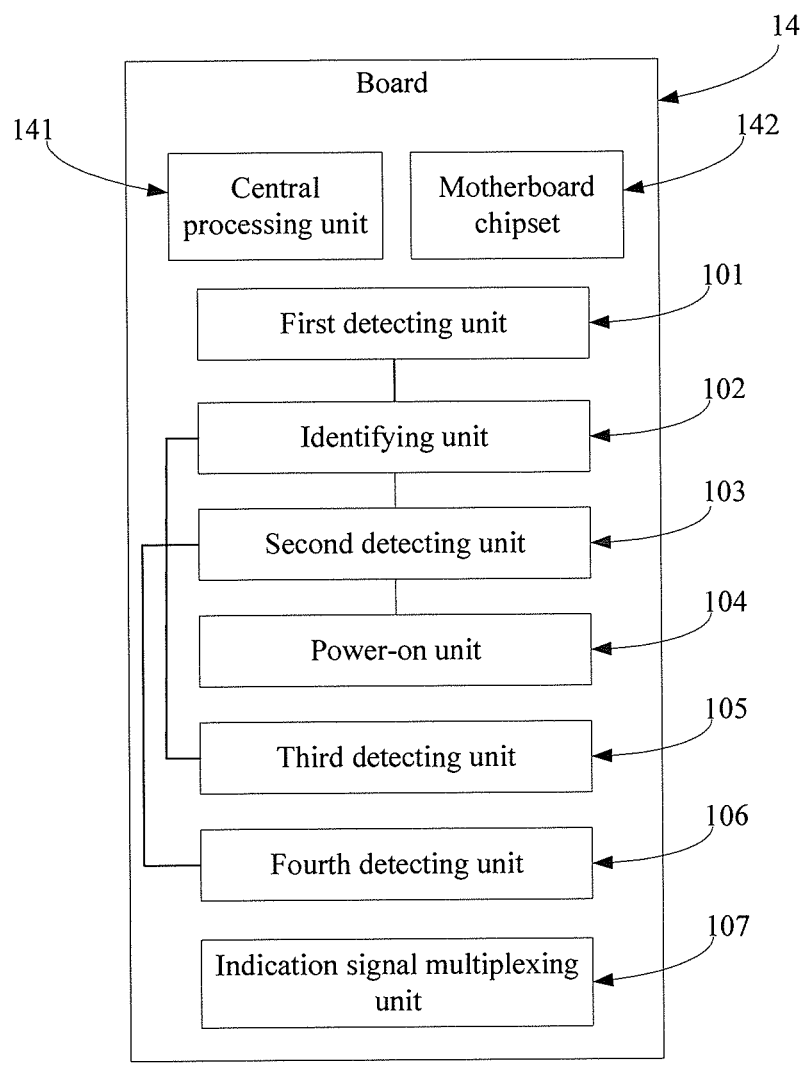
FIG. 14 is a structural diagram of a board according to Embodiment 3 of the present invention.

An embodiment of the present invention further provides a board. As shown in FIG. 14, the board 14 includes at least one central processing unit 141 and a motherboard chipset 142. In addition, the first detecting unit 101, the identifying unit 102, the second detecting unit 103, the power-on unit 104, the third detecting unit 105, the fourth detecting unit 106, and the indication signal multiplexing unit 107, which are shown in FIG. 10 to FIG. 13, are all integrated on the board 14.

According to the apparatus for setting a working mode of a multi-processor system and the board, which are provided in the embodiment of the present invention, on the one hand, after a current board is inserted into a slot, if it is detected that an associated board exists on a backplane and the associated board is not in an independent working state, the current board is powered on according to a slave working mode, so as to work coordinately with a master board; and, on the other hand, if it is not detected that the associated board exists on the backplane, if insertion of a board is detected within a detection time, the current board is powered on according to a master working mode, so as to work coordinately with a slave board. According to the foregoing solutions, when the board is inserted into the backplane, the board itself can determine and set a working mode, and the working mode does not need to be set in advance before the board is inserted into the backplane, which enhances system flexibility. In addition, no extra connector is required to connect the board, which saves costs. In addition, the master board controls a power-on time sequence of each board, which ensures a correct power-on order of each board in the multi-processor system. Moreover, by setting an indication signal multiplexing unit, correct transfer of signals between the master board and the slave board can not only be ensured, but also line multiplexing is implemented, which avoids distribution of a large number of signal cables and saves space and costs.

According to the description of the foregoing embodiments, a person skilled in the art clearly understand that the present invention may be implemented by software in addition to necessary universal hardware or by hardware only. In most circumstances, the former is preferred. Based on such an understanding, the essence of technical solutions of the present invention or the part that makes contributions to the prior art may be embodied in the form of a software product. The computer software product is stored in a readable storage medium, for example, a floppy disk, a hard disk, or an optical disc on the computer, and may include several instructions for instructing a computer device (which may be a personal computer, a server, a network device, or the like) to perform the method described in each embodiment of the present invention.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for setting a working mode of a multi-processor system comprising a backplane having at least two slots for inserting boards, the method comprising:
   detecting, after a current board is inserted into a slot of the backplane, whether an associated board exists on the backplane;
   in response to detecting that the associated board exists:
      identifying the current board as a slave board;
      allowing sending of a slave board indication signal and forbidding sending of a master board indication signal; and
      detecting whether the associated board is in an independent working state;
   in response to detecting that the associated board is not in an independent working state, powering on the current board according to a slave working mode of the slave board so as to work coordinately with the associated board; and
   in response to detecting that the associated board does not exist:
      identifying the current board as a master board; and
      allowing sending of a master board indication signal and forbidding sending of a slave board indication signal.

2. The method according to claim 1, wherein, in response to detecting that the associated board does not exist, the method further comprises:
   detecting, within a detection time, whether a board is inserted into another slot of the backplane except the slot of the current board; and
   in response to detecting that the board is inserted into another slot except the slot of the current board, powering on the current board according to a master working mode of the master board so as to work coordinately with the board in the other slot.

3. The method according to claim 1, wherein:
   in response to detecting that the current board is a slave board and that the associated board is in an independent working state, the method further comprises:
      powering on the current board according to an independent working mode; and
   in response to detecting that the current board is a master board, and that no board is inserted into another slot of the backplane except the slot of the master board within a detection time,
      powering on the current board according to the independent working mode.

4. The method according to claim 1, wherein in response to detecting that the associated board is not in an independent working state, the method further comprises:
   in response to detecting that the associated board is in a healthy running state, powering on the current board according to the slave working mode; and
   in response to detecting that the associated board is not in a healthy running state, powering on the current board according to the independent working mode.

5. A method for setting a working mode of a multi-processor system comprising a backplane having at least two slots for inserting boards, the method comprising:
   detecting, after a current board is inserted into a slot of the backplane, whether an associated board exists on the backplane;
   in response to detecting that the associated board exists:
      identifying the current board as a slave board; and
      detecting whether the associated board is in an independent working state;
   in response to detecting that the associated board is not in an independent working state, powering on the current board according to a slave working mode of the slave board so as to work coordinately with the associated board;
   in response to detecting that the associated board does not exist:
      identifying the current board as a master board;
      detecting, within a detection time, whether a board is inserted into another slot of the backplane except the slot of the current board; and
      in response to detecting that the board is inserted into another slot except the slot of the current board, powering on the current board according to a master working mode of the master board so as to work coordinately with the board in the other slot, wherein powering on the current board according to the master working mode comprises:
         performing, by a first power supply of the current board, a first power-on action on the current board;
         sending a first power-on instruction to each slave board of the current board, so that each slave board of the current board performs the first power-on action respectively according to the first power-on instruction;
         receiving a first power-on completion feedback sent by each slave board;
         performing, by a second power supply of the current board, a second power-on action on the current board;
         sending a second power-on instruction to each slave board of the current board, so that each slave board of the current board performs the second power-on action respectively according to the second power-on instruction;
         receiving a second power-on completion feedback sent by each slave board;
         performing, by a $K^{th}$ power supply of the current board, a $K^{th}$ power-on action on the current board;

sending a $K^{th}$ power-on instruction to each slave board of the current board, so that each slave board of the current board performs the $K^{th}$ power-on action respectively according to the $K^{th}$ power-on instruction; and receiving a $K^{th}$ power-on completion feedback sent by each slave board, wherein K is the number of power supplies that need to perform a power-on action in the board.

6. An apparatus for setting a working mode of a multi-processor system, the apparatus comprising:

a first detecting unit, configured to detect, after a current board is inserted into a slot of a backplane, whether an associated board exists on the backplane;

a second detecting unit, configured to detect, in response to the first detecting unit detecting that the associated board exists, whether the associated board is in an independent working state;

an identifying unit, configured to:
identify the current board as a slave board in response to the first detecting unit detecting that the associated board exists; and
identify the current board as a master board in response to the first detecting unit detecting that the associated board does not exist;

a third detecting unit, configured to detect, within a detection time in response to the first detecting unit detecting that the associated board does not exist, whether a board is inserted into another slot of the backplane except the slot of the current board; and a power-on unit, configured to:
power on the current board according to a slave working mode of the slave board in response to the second detecting unit detecting that the associated board is not in an independent working state, so as to work coordinately with the associated board; and
power on the current board according to a master working mode of the master board in response to the third detecting unit detecting that the board is inserted into another slot except the slot of the current board, so as to work coordinately with the board in the other slot;

wherein the power-on unit comprises:
a first power supply, configured to perform a first power-on action on the current board;
a power-on instruction sending subunit, configured to send a first power-on instruction to each slave board of the current board, so that each slave board of the current board performs the first power-on action respectively according to the first power-on instruction;
a power-on completion feedback receiving subunit, configured to receive a first power-on completion feedback sent by each slave board;
a second power supply, configured to perform a second power-on action on the current board, wherein
the power-on instruction sending subunit is further configured to send a second power-on instruction to each slave board of the current board, so that each slave board of the current board performs the second power-on action respectively according to the second power-on instruction, and
the power-on completion feedback receiving subunit is further configured to receive a second power-on completion feedback sent by each slave board; and
a $K^{th}$ power supply, configured to perform a $K^{th}$ power-on action on the current board, wherein
the power-on instruction sending subunit is further configured to send a $K^{th}$ power-on instruction to each slave board of the current board, so that each slave board of the current board performs the $K^{th}$ power-on action respectively according to the $K^{th}$ power-on instruction, and
the power-on completion feedback receiving subunit is further configured to receive a $K^{th}$ power-on completion feedback sent by each slave board, wherein K is the number of power supplies that need to perform a power-on action in the board.

7. The apparatus according to claim 6, wherein:

in response to the current board being a slave board, the power-on unit is further configured to power on the current board according to an independent working mode if the second detecting unit detects that the associated board is in an independent working state; and in response to the current board being a master board, the power-on unit is further configured to power on the current board according to the independent working mode if the third detecting unit detects that no board is inserted within the detection time.

8. The apparatus according to claim 6, wherein the apparatus further comprises:

a fourth detecting unit, configured to detect, in response to the second detecting unit detecting that the associated board is not in an independent working state, whether the associated board is in a healthy running state, so that the current board is powered on according to the slave working mode in response to the associated board being in a healthy running state or that the current board is powered on according to the independent working mode in response to the associated board not being in a healthy running state.

9. An apparatus for setting a working mode of a multi-processor system, the apparatus comprising:

a first detecting unit, configured to detect, after a current board is inserted into a slot of a backplane, whether an associated board exists on the backplane;

a second detecting unit, configured to detect, in response to the first detecting unit detecting that the associated board exists, whether the associated board is in an independent working state;

an identifying unit, configured to:
identify the current board as a slave board in response to the first detecting unit detecting that the associated board exists; and
identify the current board as a master board in response to the first detecting unit detecting that the associated board does not exist;

a third detecting unit, configured to detect, within a detection time in response to the first detecting unit detecting that the associated board does not exist, whether a board is inserted into another slot of the backplane except the slot of the current board;

a power-on unit, configured to:
power on the current board according to a slave working mode of the slave board in response to the second detecting unit detecting that the associated board is not in an independent working state, so as to work coordinately with the associated board; and
power on the current board according to a master working mode of the master board in response to the third detecting unit detecting that the board is inserted into another slot except the slot of the current board, so as to work coordinately with the board in the other slot;

an indication signal multiplexing unit comprising N signal cables, each signal cable is used to send at least two types of indication signals, an end A of each signal cable is connected to indication signal sending ports in the current board respectively, an end B of each signal cable is connected to a combining point, and the combining point is electrically connected to a combining point of another board, so as to transmit an indication signal between the current board and another board;

the indication signal multiplexing unit further comprises an indication signal gating switch, and, in response to the current board being a master board, the indication signal gating switch is configured to:
  disconnect, when receiving a slave board indication signal sent by the slave board, a signal cable used to send the slave board indication signal; and
  connect, when sending a master board indication signal to the slave board, a signal cable used to send the master board indication signal; and in response to the current board being a slave board, the indication signal gating switch is further configured to:
  disconnect, when receiving a master board indication signal sent by the master board, the signal cable used to send the master board indication signal; and
  connect, when sending a slave board indication signal to the master board, the signal cable used to send the slave board indication signal.

* * * * *